(12) United States Patent  (10) Patent No.: US 7,869,704 B2
Uenishi  (45) Date of Patent: Jan. 11, 2011

(54) FOCUS ADJUSTING DEVICE, IMAGE PICKUP APPARATUS, AND FOCUS ADJUSTMENT METHOD

(75) Inventor: Masaaki Uenishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 311 days.

(21) Appl. No.: 11/970,386

(22) Filed: Jan. 7, 2008

(65) Prior Publication Data

US 2008/0193115 A1  Aug. 14, 2008

(30) Foreign Application Priority Data

Feb. 8, 2007  (JP)  ............... 2007-029355

(51) Int. Cl.
*G03B 3/10* (2006.01)
(52) U.S. Cl. ........................ 396/95; 396/121
(58) Field of Classification Search ............ 396/95, 396/104, 121, 123, 125, 153, 124; 348/345, 348/349, 352
See application file for complete search history.

(56) References Cited

U.S. PATENT DOCUMENTS

| | | | |
|---|---|---|---|
| 5,659,814 A * | 8/1997 | Matsukawa et al. | 396/121 |
| 5,739,857 A | 4/1998 | Kaneda | |
| 5,995,767 A * | 11/1999 | Lee et al. | 396/123 |
| 7,433,586 B2 * | 10/2008 | Onozawa | 396/121 |
| 2005/0013601 A1 | 1/2005 | Ide | |
| 2005/0162540 A1 * | 7/2005 | Yata | 348/345 |
| 2006/0066744 A1 | 3/2006 | Stavely | |
| 2006/0285842 A1 * | 12/2006 | Ide | 396/93 |

FOREIGN PATENT DOCUMENTS

| | | |
|---|---|---|
| EP | 263510 A2 | 4/1988 |
| JP | 6-308373 A | 11/1994 |
| JP | 2000-188713 A | 7/2000 |
| JP | 2004-138970 A | 5/2004 |

OTHER PUBLICATIONS

JP2004-138970 Machined Translation available at JPO website.*

* cited by examiner

*Primary Examiner*—W. B. Perkey
*Assistant Examiner*—Minh Q Phan
(74) *Attorney, Agent, or Firm*—Canon U.S.A., Inc. I.P. Division (57) ABSTRACT

A focus adjusting device in which, when a detecting unit that detects an object image to be focused from a picked up image is capable of detecting the object image to be focused, a setting unit that sets a focus detection area when a focused state of an image pickup optical system is detected sets a second focus detection area after setting a first focus detection area and in accordance with the position of the first focus detection area, corresponding to the object image that is detected by the detecting unit and that is to be focused. Then, on the basis of signal outputs at the set focus detection area, the image pickup optical system is driven to perform focus adjustment.

9 Claims, 10 Drawing Sheets

| FIG. 3A | FIG. 3B |

| FIG. 4A | FIG. 4B |

FOCUS ADJUSTING DEVICE, IMAGE PICKUP APPARATUS, AND FOCUS ADJUSTMENT METHOD

BACKGROUND OF THE INVENTION

1. Field of the Invention

The present invention relates to a focus adjusting device, an image pickup apparatus, and a focus adjustment method. More particularly, the present invention relates to autofocusing used in, for example, an electronic still camera or a video.

2. Description of the Related Art

In an image pickup apparatus (typically, a digital camera), an autofocusing (AF) method making use of an object detection function of detecting, for example, the moving body or the face of a human being is well known. In the AF method, first, a main object is detected from a picked up image, to control focusing so that the detected main object is brought into focus.

In the AF method, when the main object is successfully detected, a focus detection area is set at the position of the detected main object, to control the focusing so the main object is brought into focus. However, when the main object cannot be detected, an area where the main object might exist, such as the center of a screen, is assumed, to set the focus detection area.

Figure 8A:
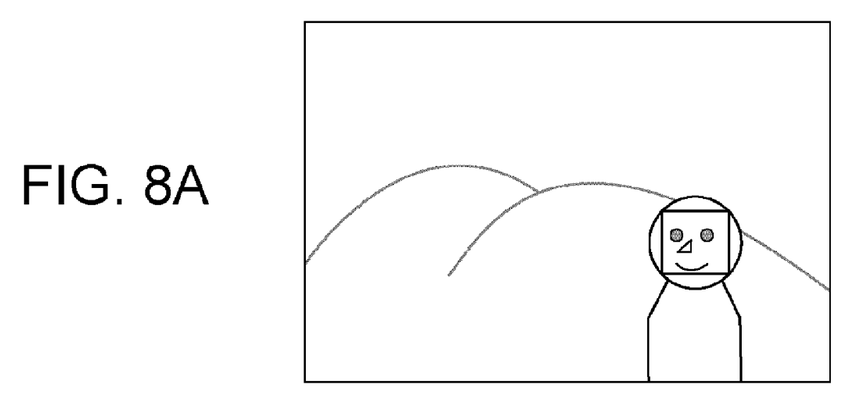
FIGS. 8A and 8B illustrate a problem in setting an AF frame in a related art.
Figure 8B:
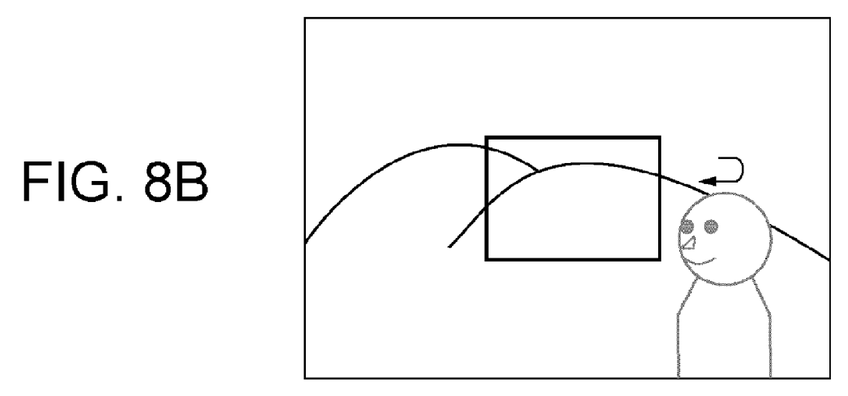

When the AF method is used to continue focusing the main object at all times at the focus detection area which is set as in, for example, a continuance AF operation or an AF operation during movie recording, the main object may or may not be successfully detected. In such a case, the position of the focus detection area is frequently changed between a main-object area and the central area of the screen. Here, when the main object does not exist at the central area of the screen, as shown in FIGS. 8A and 8B, the focus position moves between the main object and a background object, thereby resulting in flickering of the screen, which is troublesome. To overcome this problem, for example, it is necessary to set the focus detection area at the position of a previously detected main object, even if the main object cannot be successfully detected.

As a related detecting unit that detects a main object and that tries to solve to the aforementioned problem, a camera that is provided with a line-of-sight detecting function (in which the size of an area selected by line-of-sight detection is changed in accordance with the reliability of an output of the line-of-sight detection) is proposed (refer to Japanese Patent Laid-Open No. 6-308373). According to the document, when the reliability of the output of the line-of-sight detection is low, the size of a focus detection area is made large, to set a main object within the focus detection area.

In addition, a main object detecting unit that makes a focus detection area large when the main object cannot be detected is proposed in Japanese Patent Laid-Open No. 2004-138970.

Further, as an autofocusing controlling device using a moving-object detecting unit, a device that calculates the difference between AF evaluation values for image frames having different times for respective AF areas that have been previously divided and set is proposed. By calculating this difference, it is possible to extract an AF area including a moving object, so that the AF area is focused as an area to be focused. (Refer to Japanese Patent Laid-Open No. 2000-188713.)

However, Japanese Patent Laid-Open No. 6-308373 and Japanese Patent Laid-Open No. 2004-138970 discuss methods that only increase the focus detection area when the main object cannot be detected (that is, when the reliability of the detection of the main object is low). These methods do not allow the main object to be reliably set in the focus detection area unless, for example, the focus detection area is spread over the entire screen. In addition, when the focus detection area is merely increased, the proportion of the background in the focus detection area is increased. As a result, the background may be brought into focus.

In the case where a moving-object detecting unit, such as that discussed in Japanese Patent Laid-Open No. 2000-188713, is used, when the main object is a moving body, it is possible to always detect the main object to set the focus detection area. However, since a plurality of focus detection areas must be set over the entire screen, it takes time to perform calculate differences by an amount corresponding to the number of focus detection areas. Therefore, time is wasted in correspondence with the number of unnecessary focus detection areas. In addition, the main object cannot be detected when it does not move.

SUMMARY OF THE INVENTION

The present invention provides a focus adjusting device that can continue focusing a main object without performing unnecessary setting of focus detection areas, an image pickup apparatus, and a focus adjustment method.

The present invention makes it possible to continue focusing a main object without performing unnecessary setting of focus detection areas.

According to an aspect of the present invention, it is possible to carry out the following. That is, when a detecting unit that detects, from a picked up image, an object image to be focused is capable of detecting the object image to be focused, but is no longer capable of detecting the object image after setting a first focus detection area, a setting unit that sets a focus detection area for detecting a focused state of an image pickup optical system sets a second focus detection area, in addition to the first focus detection area, in accordance with the position of the focus detection area. Then, on the basis of signal outputs at the set first and second focus detection areas, the image pickup optical system is moved to adjust the focus.

Further features of the present invention will become apparent from the following description of exemplary embodiments with reference to the attached drawings.

DESCRIPTION OF THE EMBODIMENTS

Embodiments of the present invention will now be described with reference to the drawings.

Description of Apparatus

Figure 1:
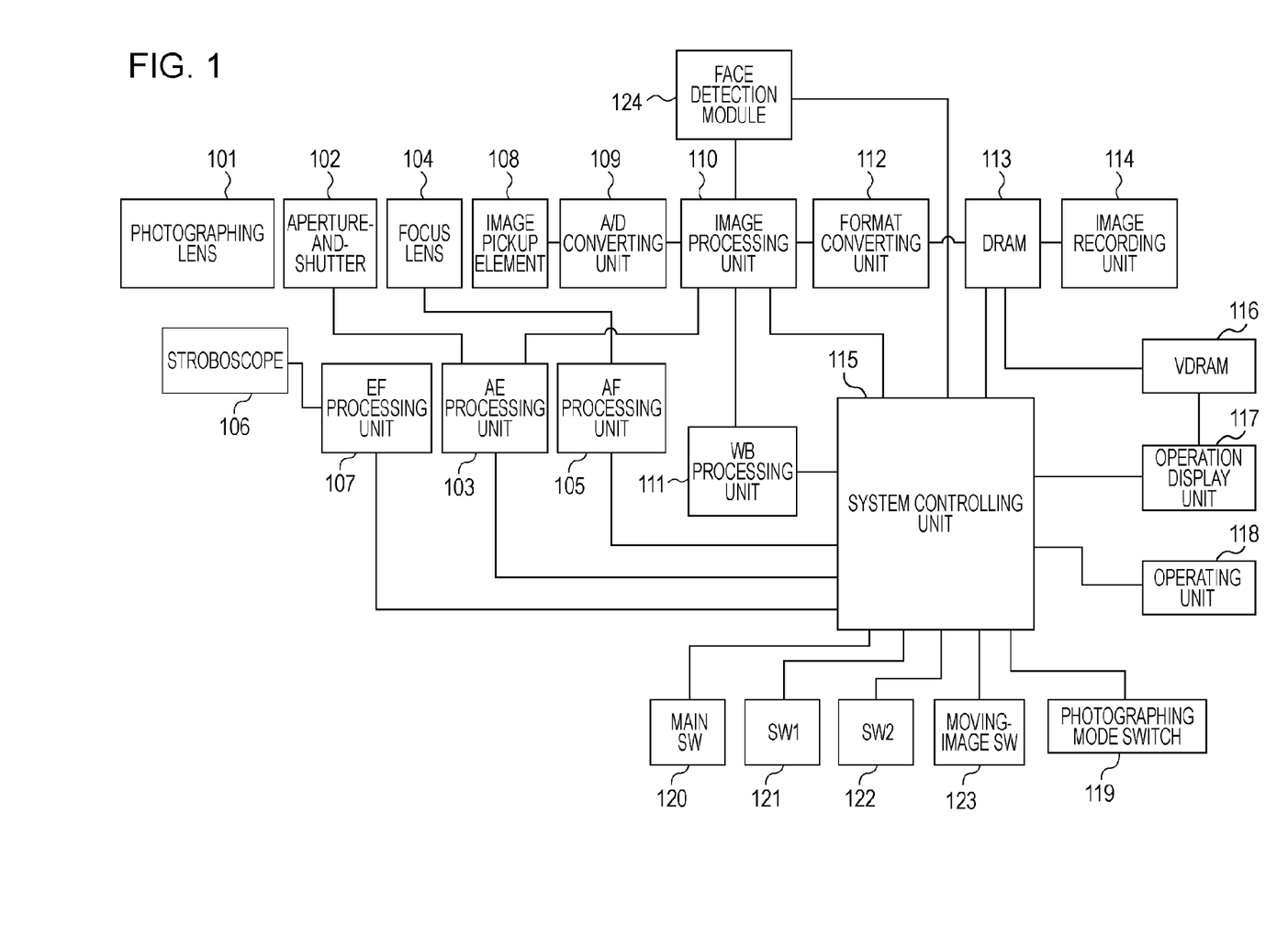
FIG. 1 is a block diagram of a structure of an electronic camera to which the present invention is applied.

FIG. 1 is a block diagram of a structure of an electronic camera, which is an image pickup apparatus according to an embodiment of the present invention. Reference numeral 101 denotes a photographing lens including a zoom mechanism, and reference numeral 102 denotes an aperture-and-shutter that controls light quantity. Reference numeral 103 denotes an automatic exposure control (AE) processing unit, and reference numeral 104 denotes a focus lens that performs focus adjustment on an image pickup element (described later). The photographing lens 101, the aperture-and-shutter 102, and the focus lens 104 are also called an image pickup optical system.

Reference numeral 105 denotes an AF processing unit, reference numeral 106 denotes a stroboscope, and reference numeral 107 denotes a flash pre-emission (EF) processing unit. Reference numeral 108 denotes the image pickup element serving as a light detecting unit or a photoelectric converting unit that converts reflected light from an object into an electrical signal (signal output) and outputs a picked up image. Reference numeral 109 denotes an A/D converting unit including a correlated double sampling (CDS) circuit that reduces output noise of the image pickup element 108 or a nonlinear amplifying circuit that performs nonlinear amplification prior to A/D conversion.

Reference numeral 110 denotes an image processing unit, reference numeral 111 denotes a white balance (WB) processing unit, and reference numeral 112 denotes a format converting unit. Reference numeral 113 denotes a high-speed internal memory (such as a random access memory; hereunder referred to as "DRAM"), reference numeral 114 denotes an image recording unit including a recording medium, such as a memory card, and an interface thereof. Reference numeral 115 denotes a system controlling unit that controls a system, such as a photographing sequence, and reference numeral 116 denotes an image display memory (hereunder referred to as "VRAM").

Reference numeral 117 denotes an operation display unit that displays an index corresponding to a focus detection area and a photographing screen when performing a photographing operation, in addition to displaying an image, performing a displaying operation for assisting an operation, and displaying the state of the camera. Reference numeral 118 denotes an operating unit for operating the camera from the outside. Reference numeral 119 denotes a photographing mode switch that performs a setting operation, such as turning on and off a face detection mode.

Reference numeral 120 denotes a main switch for turning on a power supply of the system, reference numeral 121 denotes a switch (hereunder referred to as "SW1") for performing a photographing standby operation (such as AF or AE), and reference numeral 122 denotes a photographing switch (hereunder referred to as "SW2") for performing a photographing operation after operating the SW1. Reference numeral 123 denotes a moving-image switch (hereafter referred to as "moving-image SW") that starts or ends the photographing operation of a moving image. Reference numeral 124 denotes a face detection module that detects a face as an object image using an image signal processed at the image processing unit 110, and that sends to the system controlling unit 115 information (position, size, and reliability) of one detected face or a plurality of detected faces and the order of priority determined by the face information. The method of detecting a face will not be described in detail below because it is not the central feature of the present invention.

The DRAM 113 is used as a high-speed buffer serving as a temporary image storage unit, or is used in, for example, a working memory in compressing or expanding an image. Examples of the operating unit 118 include the following. They are a menu switch, a zoom lever, and an operation mode change-over switch. The menu switch is provided with a photographing function of the electronic camera or performs various setting operations, such as a setting operation performed when reproducing an image. The zoom lever instructs a zooming operation of the photographing lens. The change-over switch switches operation modes, that is, a photographing mode and a reproduction mode.

Flow of Operation of Apparatus

Figure 2:
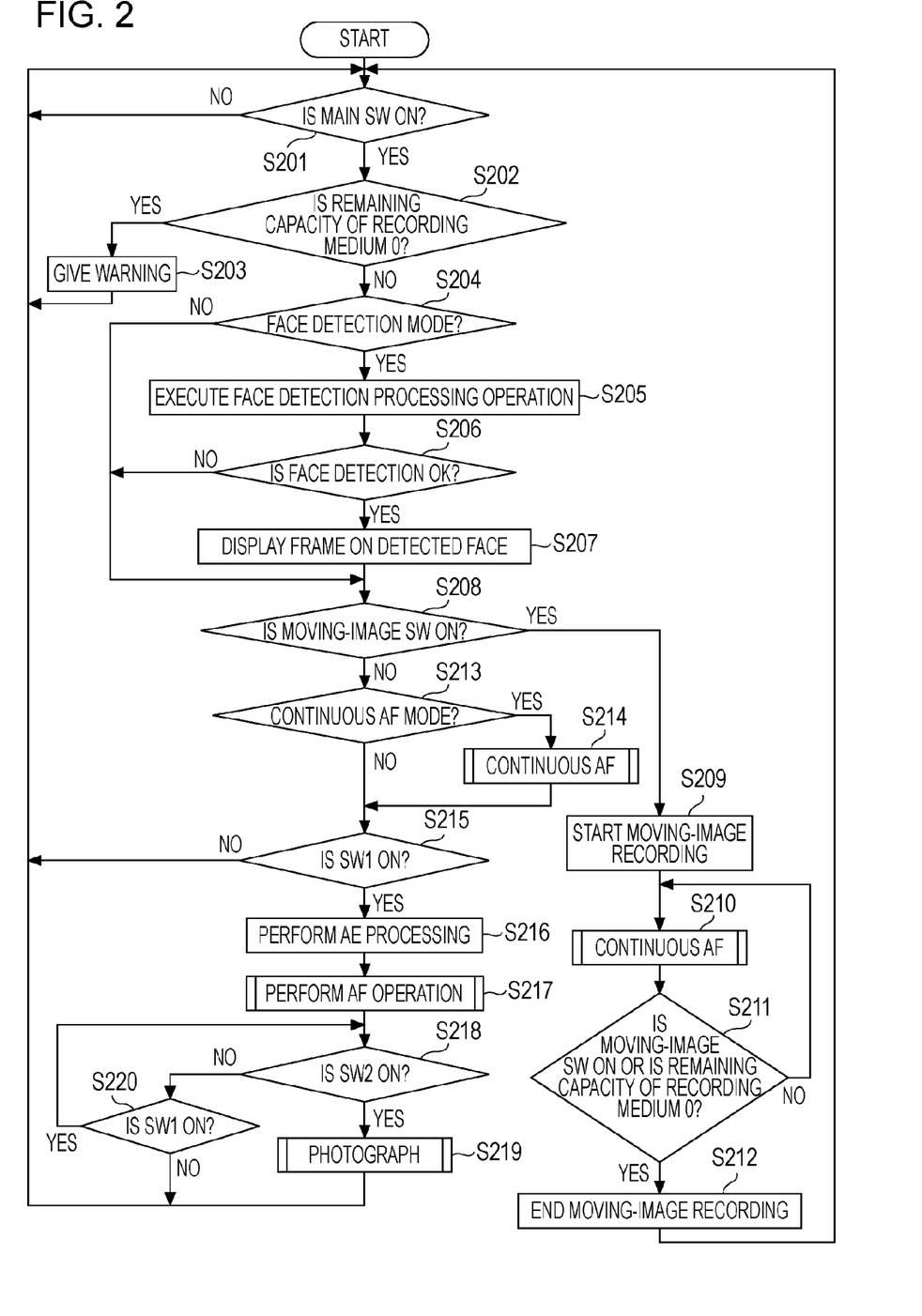
FIG. 2 is a flowchart illustrating the operation of the electronic camera to which the present invention is applied.

An operation according to an embodiment of the present invention will now be described in detail with reference to FIG. 2. FIG. 2 is a flowchart illustrating the operation of the electronic camera.

First, in Step S201, the main switch 120 is detected. If it is turned on, the process proceeds to Step S202. Here, the function of the main switch 120 is to turn on the power supply of the system. If the main switch 120 is turned off, Step S201 is repeated. In Step S202, the remaining capacity of the image recording unit 114 is examined. If the remaining capacity is zero, the process proceeds to Step S203. If it is not zero, the process proceeds to Step S204. In Step S203, a warning is given that the remaining capacity at the image recording unit 114 is zero, and the process returns to Step S201. The warning can be achieved by displaying it on the operation display unit 117, generating a warning sound from a sound outputting unit (not shown), or a combination thereof.

In Step S204, whether or not an AF mode is a face detection mode is examined. If it is a face detection mode, the process proceeds to Step S205. If it is not a face detection mode, the process proceeds to Step S208. In Step S205, a face detection processing operation is executed in the face detection module 124, to obtain face information and face priority order. Then, the process proceeds to Step S206.

In Step S206, it is examined whether or not a face is detected in the face detection processing operation of Step S205. If it is detected, the process proceeds to Step S207. If it is not detected, the process proceeds to Step S208. At this time, an image that is generated on the basis of a picked up image obtained by the image pickup element 108 is sequentially displayed. In this state, by sequentially displaying by the operation display unit 117 an image that is sequentially written to VRAM 116, the operation display unit 117 functions as an electronic finder. In Step S207, in the operation display unit 117, frames are displayed at positions of faces having Z orders of priority at most among the detected faces. The intended meaning of this sentence is that Z (design value) frames that are not troublesome to display are displayed. For example, in a group photograph, when there are tens of people, if frames are displayed for all of the faces, a screen becomes covered with frames, thereby making it difficult to see an image. To prevent this, the number of frames that is displayed for face positions is limited. Then, the process proceeds to Step S208.

In Step S208, the moving-image SW 123 is detected. If it is turned on, the process proceeds to Step S209. If it is not turned on, the process proceeds to Step S213. In Step S209, recording of the moving image is started, so that the process proceeds to Step S210. In Step S210, a continuous AF operation is performed in accordance with the flowcharts of FIGS. 3A and 3B. In Step S211, the moving-image SW 123 is detected. If it is turned on, the process proceeds to Step S212. If it is not turned on, the process proceeds to Step S210. In Step S211, the remaining capacity of the image recording unit 114 is examined. If the remaining capacity is zero, the process proceeds to Step S212. If it is not zero, the process proceeds to Step S210. In Step S212, the recording of the moving image is ended, so that the process returns to Step S201.

In Step S213, whether the AF mode is a continuous AF mode or a single AF mode is examined. If it is a continuous AF mode, the process proceeds to Step S214. If it is a single AF mode, the process proceeds to Step S215. In Step S214, a continuous AF operation is performed in accordance with the flowcharts of FIGS. 3A and 3B (described later).

In Step S215, the state of the SW1 is examined. If it is turned on, the process proceeds to Step S216. If it is not turned on, the process returns to Step S201. In Step S216, at the AE processing unit 103, AE processing is performed from an output of the image processing unit 110.

Figure 6:
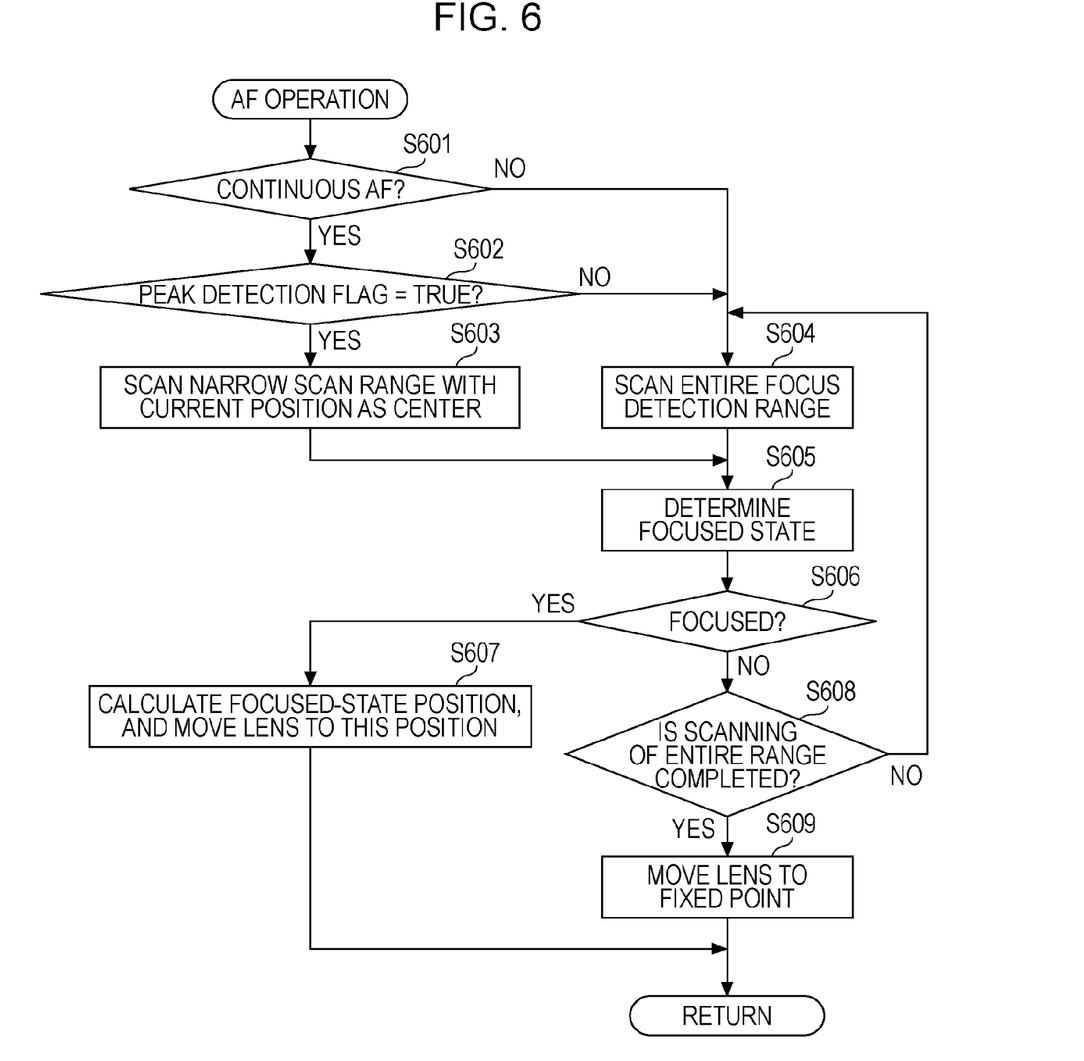
FIG. 6 is a flowchart of a subroutine of an AF operation in FIG. 2.

In Step S217, an AF operation is performed in accordance with the flowchart of FIG. 6 (described later). In Step S218, the state of SW2 is examined. If it is turned on, the process proceeds to Step S219. If it is not turned on, the process proceeds to Step S220. In Step S219, a photographing operation is performed in accordance with the flowchart of FIG. 7 (described later). In Step S220, the state of the SW1 is examined. If it is not turned on, the process returns to Step S201. If it is turned on, the process returns to Step S218, to lock the focusing operation until the SW2 is turned on or the SW1 is turned off.

Continuous AF Subroutine

Figures 3, 3A:
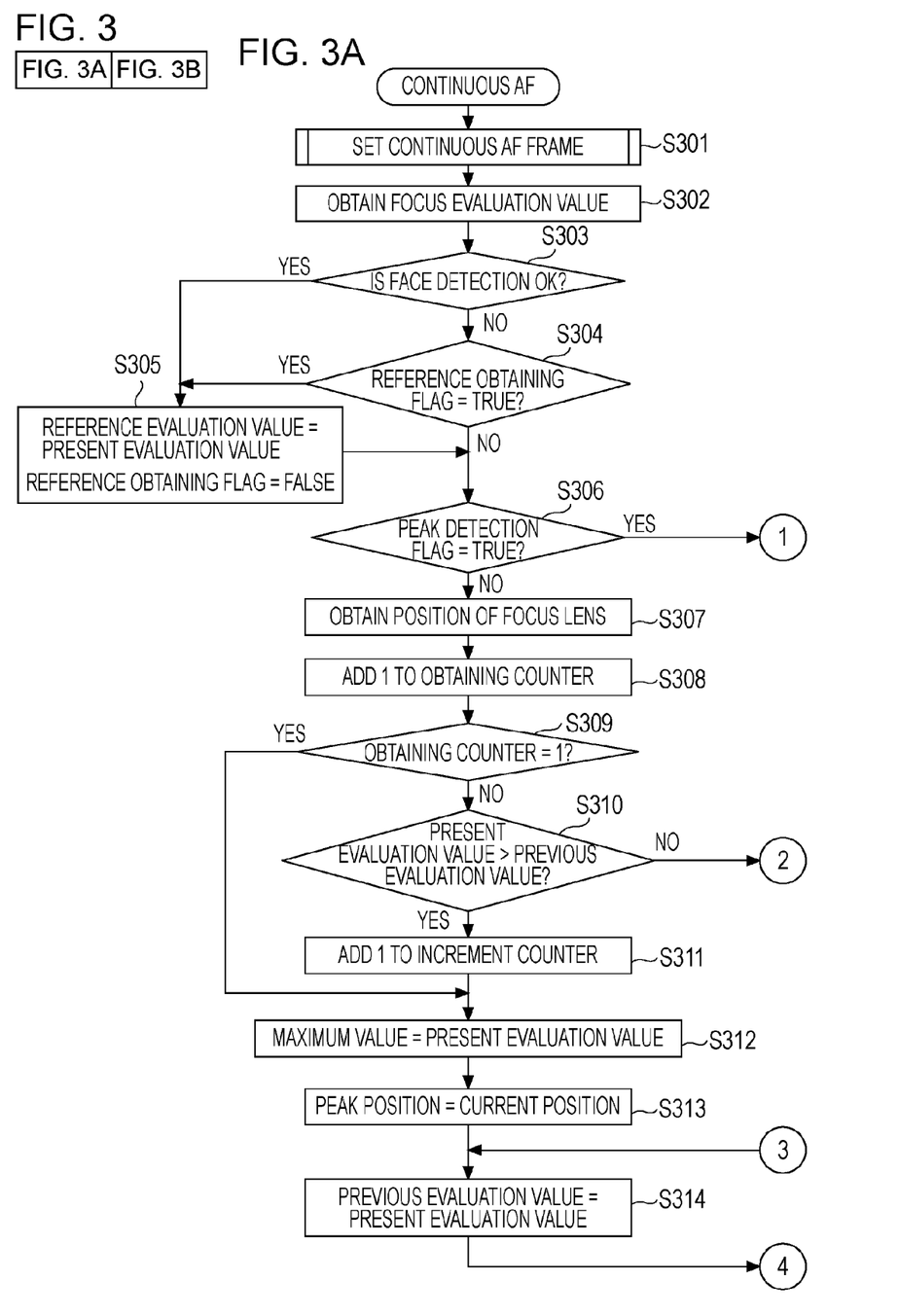
FIGS. 3A and 3B are flowcharts of a subroutine of continuous AF operations in FIG. 2.
Figure 3B:
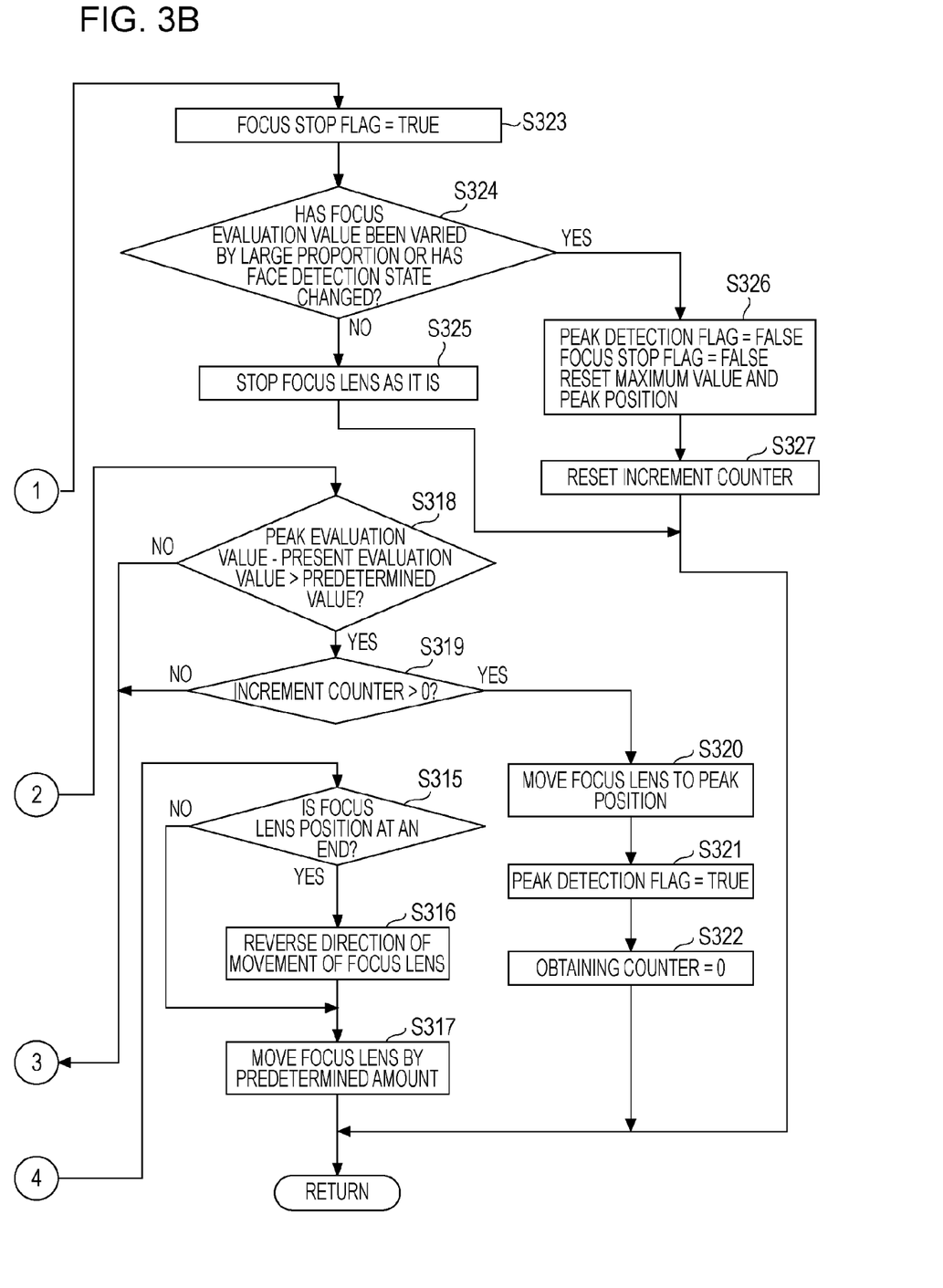

A subroutine of the continuous AF operation of Step S210 and a subroutine of the continuous AF operation of Step S214 in the flowchart of FIG. 2 will now be described with reference to the flowcharts of FIGS. 3A and 3B.

First, in Step S301, in accordance with the flowcharts of FIGS. 4A and 4B (described later), a focus detection area (hereunder referred to as "AF frame") is set, and the process proceeds to Step S302. In Step S302, a focus evaluation value (also called "AF evaluation value") is obtained. In Step S303, whether or not a face is detected is examined. If a face is detected, the process proceeds to Step S305. If a face is not detected, the process proceeds to Step S304. In Step S304, whether or not a reference obtaining flag, used to determine whether or not a reference evaluation value (reference value) is obtained and used in the flowcharts of FIGS. 4A and 4B (described later), is true is examined. If it is true, the process proceeds to Step S305. If it is false, the process proceeds to Step S306. In Step S305, the focus evaluation value is stored, as a reference evaluation value, in a computing memory (not shown) built in the system controlling unit 115. In addition, the reference obtaining flag is made false.

In Step S306, whether or not a peak detection flag is true is examined. If it is true, the process proceeds to Step S323. If it is false, the process proceeds to Step S307. In Step S307, the current position of the focus lens 104 is obtained. In Step S308, "1" is added to an obtaining counter for counting the number of times the focus evaluation value is obtained and the number of times the current position of the focus lens 104 is obtained. In an initialization operation (not shown), the obtaining counter is previously set at 0. In Step S309, whether or not the value of the obtaining counter is 1 is examined. If it is 1, the process proceeds to Step S312. If it is not 1, the process proceeds to Step S310.

In Step S310, whether or not the present evaluation value is greater than a previous focus evaluation value is determined. If present evaluation value is greater than the previous focus evaluation value, the process proceeds to Step S311. If it is not greater than the previous focus evaluation value, the process proceeds to Step S318.

In Step S311, "1" is added to an increment counter that counts increments of the present evaluation value from the previous focus evaluation value. In an initialization operation (not shown), the increment counter is previously set at 0.

In Step S312, the present focus evaluation value is stored, as a maximum value of the focus evaluation value, in the computing memory (not shown) built in the system controlling unit 115. In Step S313, the current position of the focus lens 104 is stored, as a peak position of the focus evaluation value, in the computing memory (not shown) built in the system controlling unit 115. In Step S314, the current focus evaluation value is stored, as the previous focus evaluation value, in the computing memory (not shown) built in the system controlling unit 115. In Step S315, whether or not the current position of the focus lens 104 is at an end of a focus detection range is examined. If it is at an end of the focus detection range, the process proceeds to Step S316. If it is not at an end of the focus detection range, the process proceeds to Step S317. In Step S316, the direction of movement of the focus lens 104 is reversed. In Step S317, the focus lens 104 is moved by a predetermined amount.

In Step S318, whether or not the difference between the maximum value of the focus evaluation value and the current focus evaluation value is greater than a predetermined value is examined. If the difference is greater than the predetermined value, the process proceeds to Step S319. If the difference is not greater than the predetermined value, the process proceeds to Step S314. In Step S319, whether or not the value of the increment counter is greater than 0 is examined. If it is less than 0, the process proceeds to Step S314. If it is greater than 0, the process proceeds to Step S320. Here, if, after continuingly increasing the previous focus evaluation value, the difference between the maximum value of the focus evaluation value and the current focus evaluation value is greater than the predetermined value, that is, the maximum value is reduced by the predetermined value, the maximum value is determined as a focus peak position. In Step S320, the focus lens 104 is moved to the peak position where the focus evaluation value stored in Step S307 is a maximum. In Step S321, the peak detection flag is made true. In Step S322, the obtaining counter is set at 0.

In Step S323, a focus stop flag that indicates that a focusing operation is stopped as a result of detecting a peak is made true, so that the process proceeds to Step S324. In Step S324, whether or not the present focus evaluation value is varied with respect to the maximum value of the focus evaluation value by a proportion greater than or equal to a predetermined proportion is examined. If it is varied by a proportion greater than or equal to the predetermined proportion, the process proceeds to Step S326. If it is varied by a small proportion, the process proceeds to Step S325. In Step S325, the position of the focus lens 104 is maintained as it is. In Step S326, since the position of the focus lens where the focus evaluation value is a maximum is re-determined, the peak detection flag and the focus stop flag are both made false, so that the maximum value of the focus evaluation value and the peak position are reset. In Step S327, the increment counter is reset to end the subroutine.

As described above, in the continuous AF operation, the focus lens is driven so that a focused state in the AF frame is achieved at all times.

Subroutine of Setting AF frame

A subroutine of setting continuous AF frames of Step S301 in the flowchart of FIG. 3A will now be described with reference to the flowcharts of FIGS. 4A and 4B and the illustrations of FIGS. 5A to 5D. FIGS. 4A and 4B are flowcharts of the subroutine of setting continuous AF frames (Step S301) in the flowchart in FIG. 3A. FIGS. 5A to 5D illustrate a method of setting AF frames in the flowcharts of FIGS. 4A and 4B.

First, in Step S401, whether or not a face is detected is examined. If a face is detected, the process proceeds to Step S402. If a face is not detected, the process proceeds to Step S404. In Step S402, as shown in FIG. 5A, at the position of the face having the highest priority in the most recent face detection processing result (hereunder referred to as "main face"), one AF frame is set as an AF frame corresponding to a main object. Then, the process proceeds to Step S403. Here, the center of the AF frame in an image may correspond to the center of the detected main face or midway between both eyes. "WID," which is a size as shown in FIG. 5A, is determined on the basis of the size of the detected main face. In Step S403, a face detection flag indicating that a face is detected is made true. In addition, a face tracking flag (described later) is made false. Thereafter, a face NG counter that counts the number of times a focus evaluation value is obtained from the state in which a face can no longer be detected is cleared, so that the process proceeds to Step S302 of FIG. 3A. At this time, what is detected as a main object to be focused can be indicated to a photographer by superposing the area of the detected face upon and displaying it at an image generated on the basis of a picked up image obtained by the image pickup element 108. Here, "a display indicating the area of the face" refers to a display indicating coordinates of a rectangular area, surrounding the area of the face and extending along the size of the detected face area, as an identifying area indicating the position of the main object to be focused. In identifying the face area at this time, for example, a pair of eyes, nose, mouth, and the lines of the face may be detected, to determine the area of the face of a person by the relative positions of these parts. However, the area surrounding the face area is not limited to a rectangular area, so that it may be an elliptical area, a shape extending along the lines of the detected face, etc. The "display indicating the area of the face" also refers to a display corresponding to an AF frame, and may be an index.

Accordingly, during the period in which the face is being detected, the AF frame is always set at the position of the main face, which is the main object, to perform the continuous AF operation, so that the main face can be continuously focused.

In Step S404, whether or not the face detection flag is true is examined. If the face detection flag is true, the process proceeds to Step S406. If the face detection flag is false, the process proceeds to Step S405. In Step S405, the AF frame is set at the center of a screen. The process then proceeds to Step S302 in FIG. 3A.

Accordingly, when a face is not detected, or when the position of the face cannot be estimated, the AF frame is set at the center position where the main object might exist. In addition, the display of the area that is superposed upon the image that is generated on the basis of the picked up image obtained by the image pickup element 108 is switched to a display of an area corresponding to the AF frame.

In Step S406, whether or not the focus stop flag is true is examined. If the focus stop flag is true, the process proceeds to Step S422. If it is false, the process proceeds to Step S407.

The operations in the following Steps S407 to Step S421 are related to an operation for detecting the movement of the face and a face tracking operation (in which an AF frame indicating a focus evaluation value substantially equal to the reference evaluation value after detecting the movement of the face is determined as a movement-destination AF frame). These operations are performed when the detection of the face is unsuccessfully performed (that is, no good (NG)). A focus evaluation value of an AF frame that is set from the most recent result of detection of a face is compared with the reference evaluation value used for face movement detection and re-obtained in Step S304 of FIG. 3A when a face detection state is OK or the reference obtaining flag is true, so that the face tracking operation is performed. When the face tracking operation is performed, the face tracking flag is true.

In Step S407, whether or not the face tracking flag is true is examined. If the face tracking flag is true, the process proceeds to Step S410. If it is false, the process proceeds to Step S408. In Step S408, with reference to the previously set AF-frame position, that is, the AF frame set from the most recent result of face detection, N×M frames are set. Then, the process proceeds to Step S409. For example, when N=3 and M=3, as shown in FIG. 5B, 3×3 or 9 AF frames are set. An AF frame used to determine a change in the focus evaluation value in Step S411 (described later) corresponds to the AF frame set at the previously set AF-frame position. In Step S409, the face tracking flag is true. When the face tracking flag is true, N×M frames are set. However, instead of areas corresponding to the frames, an area corresponding to the reference AF frame is superposed upon and displayed at the image generated on the basis of the picked up image obtained by the image pickup element 108 and displayed on the operation display unit 117. The display makes it possible to indicate to a photographer the location of focus of the camera.

In Step S410, whether or not a change counter that counts the number of changes in the focus evaluation value in Step S412 (described below) is a predetermined value is examined. If the value of the change counter is equal to the predetermined value, the process proceeds to Step S414. If it is not equal to the predetermined value, the process proceeds to Step S411. In Step S411, whether or not the focus evaluation value is changed from the reference evaluation value by a proportion greater than or equal to a predetermined proportion (which is set as an evaluation-value change threshold value) is examined. If the focus evaluation value is changed by a proportion greater than or equal to the predetermined proportion, the process proceeds to Step S412. If not, the process proceeds to Step S413. In Step S412, "1" is added to the change counter that counts the number of times the focus evaluation value changes continuously from the reference evaluation value by a proportion greater than or equal to the predetermined proportion. In Step S413, since the focus evaluation value does not change by a proportion greater than or equal to the predetermined proportion, the change counter is cleared.

Figure 5A:
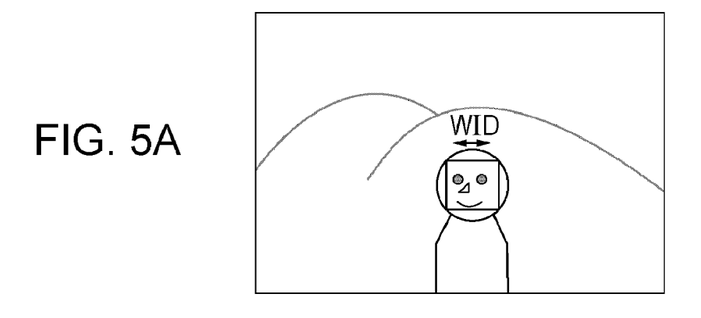
FIGS. 5A to 5D illustrate a method of setting an AF frame during the continuous AF operation in FIGS. 4A and 4B.
Figure 5B:
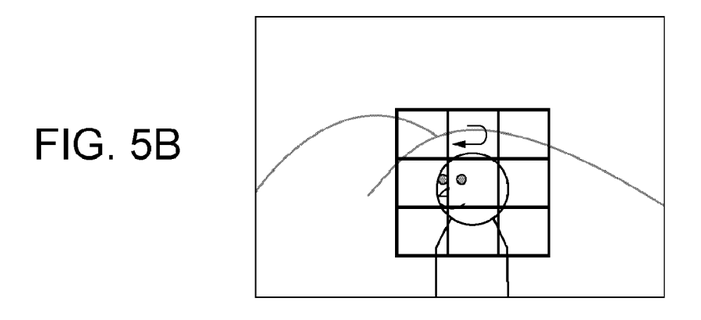
Figure 5C:
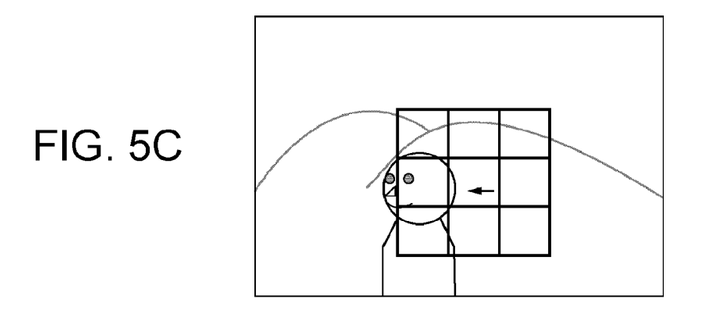

In this way, when the main object undergoes a change as shown in, for example, FIGS. 5B and 5C, the focus evaluation value of the AF frame that is set at the previously set AF frame position is changed, so that it is possible to determine that the main face, which is the main object, has moved.

The operations in the following Steps S414 to S421 are performed when, in Steps S410 and S411, it is determined that the focus evaluation value is changed with respect to the reference evaluation value and that the face moves by a number of times corresponding to the number of successive changes. In addition, these operations are related to an operation that is performed when, from a plurality of set AF frames, it is determined that the AF frame indicating a focus evaluation value that is substantially equal to the reference evaluation value is the movement-destination AF frame.

In Step S414, a very small range is scanned with the current position of the focus lens as center. That is, the focus evaluation value corresponding to a focused state is obtained by obtaining an image while moving the focus lens. In Step S415, the focused state is determined with every set AF frame on the basis of whether or not a peak value that is greater than or equal to a predetermined value exists in the focus evaluation values obtained by scanning. In Step S416, whether or not there exists an AF frame where a focused state is achieved in the focused-state determination results of the plurality of AF frames is examined. If there exists such an AF frame, the process proceeds to Step S417. If not, the process proceeds to Step S405. In Step S417, the AF frame in which the proportion of change with respect to the reference evaluation value is smallest among the peak values of the focus evaluation values obtained by scanning in the respective AF frames is determined as the most probable face AF frame and selected. In Step S418, whether or not the proportion of change of the focus evaluation value of the selected AF frame is within the predetermined proportion (that is set as a face-evaluation-value determining threshold value) with respect to the reference evaluation value is examined. If the proportion of change is within the predetermined proportion, the process proceeds to Step S419. If not, the process proceeds to Step S405. In Step S419, with reference to the selected AF frame position, as in Step S408, the N×M AF frames are reset. In Step S420, the reference obtaining flag is true, and the change counter is cleared in Step S421.

Figure 5D:
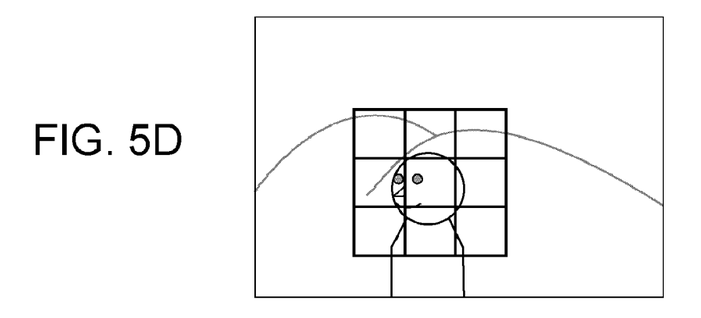

In this way, for example, when the position of the main object is changed from the position shown in FIG. 5B to the position shown in FIG. 5C, the movement of the face and the movement-destination frame to which the face moves are determined, so that the AF frames can be reset as shown in FIG. 5D. By this operation, even after the face can no longer be detected, it possible to continue setting the AF frames at the position of the face, so that the focusing of the face can be continued. In addition, it is not necessary to provide a plurality of frames over the entire screen. That is, the frames only need to be provided at and in the vicinity of the face, so that the computation time is not wasted.

In Step S422, the setting of the AF frames is maintained, and the process proceeds to Step S423. In Step S423, "1" is added to the face NG counter (which counts the number of times the focus evaluation value is obtained from the state in which the face can no longer be detected), and the process proceeds to Step S424. In Step S424, whether or not the value of the face NG counter is greater than or equal to a predetermined value is examined. If it is greater than or equal to the predetermined value, it is determined that the main object is not within the screen, and the process proceeds to Step S405 to set the AF frames at the center of the screen.

Accordingly, if the face is no longer detected by the number of times greater than or equal to a predetermined number of times after the face has been detected, it is determined that the face is no longer within the screen, so that the tracking of the face is stopped. In the continuous AF operation during recording of the moving image in Step S210 in FIG. 2 and the continuous AF operation prior to picking up a still image in Step S214 in FIG. 2, a threshold value of the change counter in Step S410 in FIG. 4B may be changed. In addition, the evaluation value change threshold value in Step S411, the face-evaluation-value determining threshold value in Step S418, and a threshold value of the face NG counter in Step S424 may be changed.

Subroutine of AF Operation

A subroutine of the AF operation in S217 in the flowchart of FIG. 2 will now be described with reference to the flowchart of FIG. 6.

First, in Step S601, whether or not the continuous AF operation is being performed is examined. If the continuous AF operation is being performed, the process proceeds to Step S602. If not, the process proceeds to Step S604. In Step S602, whether or not the peak detection flag in the continuous AF operation in FIGS. 3A and 3B is true is examined. If it is true, the process proceeds to Step S603. If not, the process proceeds to Step S604. In Step S603, a state close to the focused state may be achieved due to the continuous AF operation. Therefore, a controlling operation is performed so that scanning is performed over a range that is narrower than the entire focus detection range with the current focus lens position as center. In contrast, in Step S604, a controlling operation is performed so that scanning is performed over the entire focus detection range.

In Step S605, an AF evaluation value computing section in the AF processing unit 105 is used to determine a focused state on the basis of whether or not there exists a peak value greater than or equal to the predetermined value in the focus evaluation values obtained by scanning. In Step S606, whether or not the focused-state determination result in Step S605 is a focused state is examined. If it is a focused state, the process proceeds to Step S607. If not, the process proceeds to Step S608. In Step S607, a controlling operation is performed so that the focus lens 104 is moved to the position of the focus lens 104 when a focused-state position determining section in the AF processing unit 105 extracts a peak value that is greater than or equal to the predetermined value, that is, the focus lens 104 is moved to the focused-state position. In addition, a controlling operation is performed so that the focused focus detection area is displayed on the operation display unit 117. Since, in Step S608, the entire focus detection range is scanned when the narrow range is only scanned, whether or not the scanning of the entire focus detection range is completed is examined. If the scanning of the entire focus detection range is completed, the process proceeds to Step S609. If not, the process proceeds to Step S604. In Step S609, a peak value that is greater than or equal to the predetermined value cannot be determined, so that the focused state is not achieved. Therefore, the focus lens 104 is moved to a previously set position called a fixed point.

Subroutine of Photographing Operation

Figure 7:
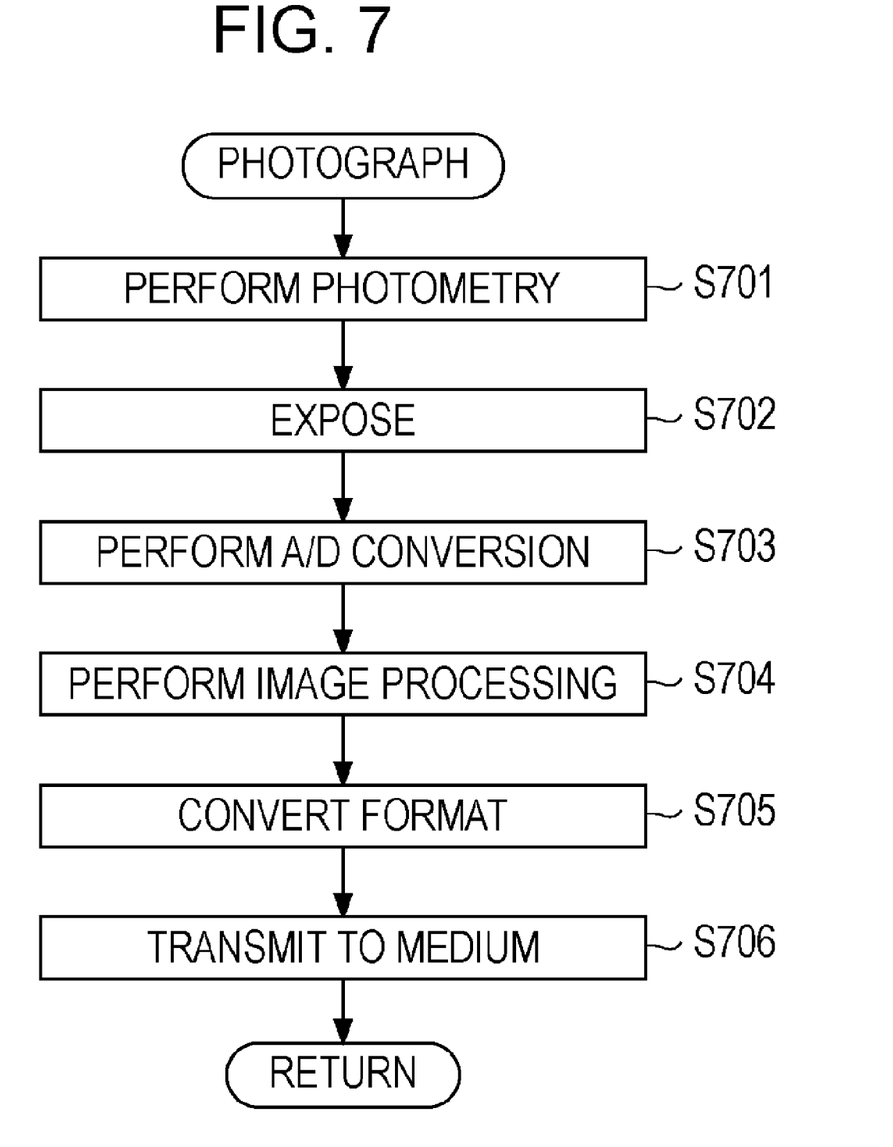
FIG. 7 is a flowchart of a subroutine of a photographing operation in FIG. 2.

A subroutine of the photographing operation in Step S219 in the flowchart of FIG. 2 will now be described with reference to the flowchart of FIG. 7.

First, in Step S701, the brightness of the object is measured. In Step S702, exposure is performed on the image pickup element 108 in accordance with the brightness of the object measured in Step S701. An image formed on a surface of the image pickup element by the exposure is subjected to photoelectric conversion and becomes an analog signal. In Step S703, the analog signal is transmitted to the A/D converting unit 109, and is converted into a digital signal after pre-processing such as nonlinear processing or noise reduction of an output of the image pickup element 108. Then, in Step S704, the image processing unit 110 processes an output signal from the A/D converting unit 109 into a suitable output image signal. Then, in Step S705, image format conversion, such as conversion to a JPEG format, is performed on the output image signal, and the resulting output image signal is transmitted to and stored in the recording unit 114 in Step S706.

Although, in the foregoing description, the main object to be photographed by the photographer is a human being, and an area for focus detection is an area where the face is detected, the present invention is not limited thereto. For example, it is possible to cut out an object image from the background, and detect this as a main object, to set an area corresponding to the position of the object as a focus detection area.

Figures 4, 4A:
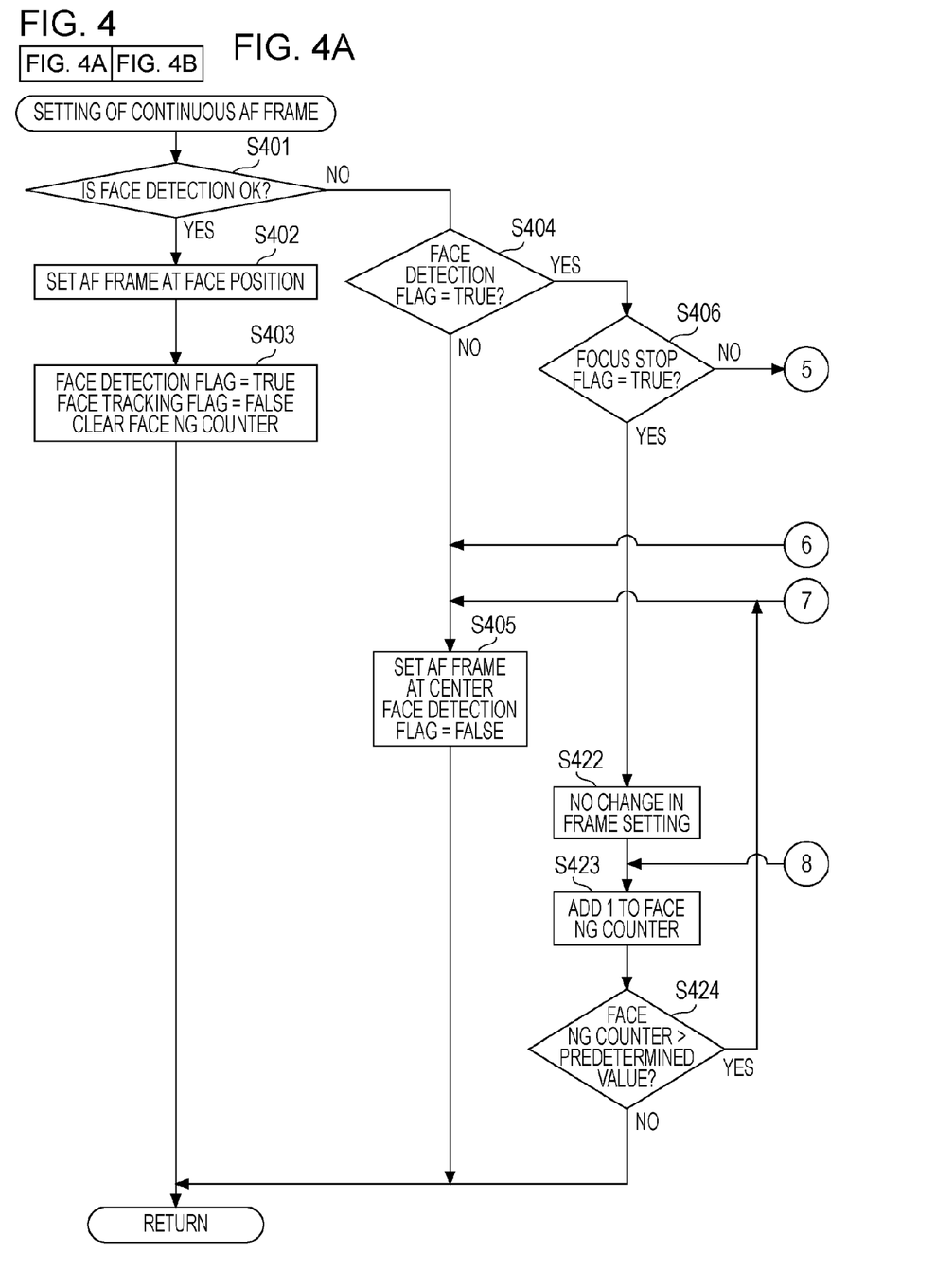
FIGS. 4A and 4B are flowcharts of a subroutine of setting an AF frame during the continuous AF operation in FIGS. 3A and 3B.

In Step S424 in FIG. 4A, when the face is unsuccessfully detected by a number of times greater than or equal to the predetermined number of times, and the setting of the plurality of focus detection areas is repeated, the tracking of the face is stopped, and the focus detection areas are set at the center of the screen. However, the present invention is not limited thereto. That is, when the face is unsuccessfully detected after a predetermined time has elapsed, it is possible to stop the tracking of the face, and set the focus detection areas at the center of the screen.

Figure 4B:
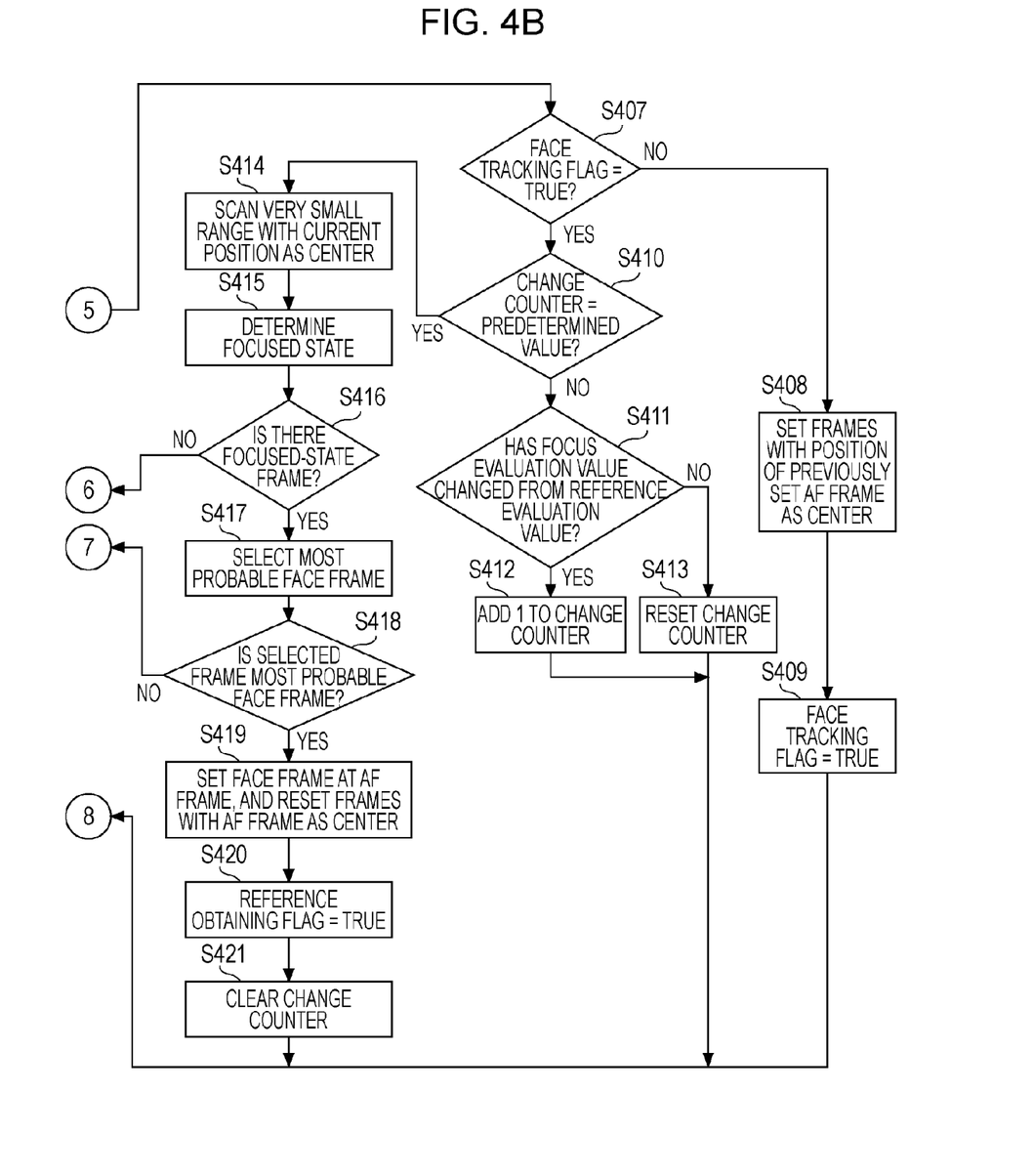

In Step S408 in FIG. 4B, N×M frames are set with reference to a previously set AF-frame position. However, when the previously set AF-frame position exists towards an end where the N×M frames cannot be set, the number of AF frames can be made less than N×M frames, and set.

In the foregoing description, the face of an object is detected on the basis of a picked up image. Then, on the basis of a detected face area, a main object is determined to set a focus detection area corresponding to the main object. Then, on the basis of the picked up image in the focus detection area, a focus evaluation value is calculated to perform focus adjustment. However, the present invention is not limited thereto. For example, it is possible to detect a defocusing amount of the focus lens in a focus detection area of a phase-difference detecting sensor corresponding to an area where the face is detected, to perform focus adjustment. Even in this case, when the face, or the main object, can no longer be detected, the defocusing amounts of the focus lens in focus detection areas of the phase-difference detecting sensor, corresponding to the main-object position when the face is previously successfully detected and the position of the vicinity thereof, are detected. Then, focus adjustment is performed on the basis of the detection results. By this, it is possible to continuously focus the main object without performing unnecessary setting of focus detection areas.

In the foregoing description, when face detection is unsuccessfully performed (that is, no good (NG)), N×M frames are set with reference to an AF frame where a recent face detection is successfully performed. However, even if a large number of frames do not exist, an AF frame differing from the AF frame where the face is successfully detected is set along with the AF frame where the face is successfully detected, to perform focus adjustment on the basis of the result of detection in the focus detection area corresponding to this position.

When the face tracking flag is true, instead of areas corresponding to the frames, an area corresponding to an AF frame serving as a reference is superposed upon and displayed at an image displayed by the operation display unit 117. However, the areas corresponding to the frames can be superposed upon and displayed at the image displayed by the operation display unit 117, or it is possible not to display the areas when tracking the face.

In the embodiment described above, even if the main object can no longer be successfully detected, the focusing is controlled by setting the main focus detection area at the main object position which is successfully detected. In addition, with reference to the main focus detection area, a minimum number of focus detection areas is set. Then, the movement and destination of movement of the main object are determined from the focus evaluation value of each focus detection area, and the main focus detection area and the focus detection areas are repeatedly reset on the basis of the movement destination. This makes it possible to continuously focus the main object without performing unnecessary setting of focus detection areas. Further, since there is no need to perform unnecessary setting of focus detection areas, unnecessary computation time can be reduced.

Other Embodiments

According to a further embodiment of the present invention there is provided a focus adjusting device comprising a detecting unit configured to detect an image of an object to be focused, from a picked up image; a setting unit configured to set a focus detection area for when a focused state of an image pickup optical system is detected; and a focus adjusting unit configured to adjust a focus by moving the image pickup optical system on the basis of a signal output at the focus detection area, wherein, when the detecting unit is capable of detecting the object image to be focused, but is no longer capable of performing the detection after a first focus detection area is set, the setting unit sets, in addition to the first focus detection area, at least one second focus detection area in accordance with the position of the first focus detection area.

A further embodiment of the present invention provides a focus adjustment method of a focus adjusting device, the method comprising detecting an image of an object to be focused, from a picked up image; setting a focus detection area for when a focused state of an image pickup optical system is detected; and adjusting a focus by moving the image pickup optical system on the basis of a signal output at the focus detection area, wherein, when the detecting step is capable of detecting the object image to be focused, but is no longer capable of performing the detection after a first focus detection area is set, the setting step sets, in addition to the set first focus detection area, a second focus detection area in accordance with the position of the first focus detection area.

A further embodiment of the present invention provides a focus adjusting device comprising a detecting unit configured to detect an image of an object to be focused, from a picked up image; a setting unit configured to set a focus detection area for when a focused state of an image pickup optical system is detected; and a focus adjusting unit configured to adjust a focus by moving the image pickup optical system on the basis of a signal output at the focus detection area, wherein the setting unit sets a first focus detection area corresponding to the object image that is detected by the detecting unit and that is to be focused, or both the previously set first focus detection area and a second focus detection area that is in accordance with the position of the first focus detection area.

A further embodiment of the present invention provides a focus adjustment method of a focus adjusting device, the method comprising detecting an image of an object to be focused, from a picked up image; setting a focus detection area for when a focused state of an image pickup optical system is detected; and adjusting a focus by moving the image pickup optical system on the basis of a signal output at the focus detection area, wherein the setting step is used to set a first focus detection area corresponding to the object image that is detected by the detecting step and that is to be focused, or both the previously set first focus detection area and a second focus detection area that is in accordance with the position of the first focus detection area.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-029355 filed Feb. 8, 2007, which is hereby incorporated by reference herein in its entirety.

What is claimed is:

1. A focus adjusting device comprising:
  a detecting unit configured to detect a focusing target from a captured image;
  a setting unit configured to set, in response to the detection of the focusing target by the detecting unit, a focus detection area for detecting a focusing condition of a focusing lens; and
  a focus adjusting unit configured to perform focus adjustment by moving the focusing lens based on an image of the focus detection area,
  wherein the setting unit is operable, when the focusing target is no longer detected after a first focus detection area has been set in response to the detection of the focusing target by the detecting unit, to set at least one second focus detection area in accordance with the position of the first focus detection area,
  wherein a focused state that is obtained in the focus detection area when the detecting unit is capable of detecting the focusing target is set as a reference value, and the focus adjusting unit is configured to drive the focusing lens on the basis of a comparison between the reference value and a focused state obtained at the first focus detection area and a comparison between the reference value and a focused state obtained at the second focus detection area.

2. A focus adjusting device according to claim 1, further comprising a determining unit configured to, when the values of the focused states obtained at the first and second focus detection areas vary with respect to the reference value by a predetermined proportion, determine that the object image has moved, detect the focused states in the first and second focus detection areas while driving the focusing lens, and determine a focus detection area where the object exists from the first and second focus detection areas on the basis of the reference value and result of the detection.

3. A focus adjusting device according to claim 1, wherein the setting unit is operable, when the focusing target is no longer detected after a first focus detection area has been set in response to the detection of the focusing target by the detecting unit, to set at least one second focus detection area, in addition to the first focus detection area.

4. A focus adjusting device according to claim 3, further comprising a display unit configured to display an index at the focus detection area, wherein, when the focusing target is no longer detected after a first focus detection area has been set in response to the detection of the focusing target by the detecting unit, the display unit displays the index.

5. A focus adjusting device according to claim 1, wherein the detecting unit is operable to detect at least one of the position, size, and reliability of an object corresponding to the object image to be focused.

6. A focus adjusting device according to claim 1, wherein the first focus detection area is equal in size to the or each second focus detection area are equal to each other.

7. A focus adjusting device according to claim 1, wherein the focus adjusting unit is operable to inhibit driving of the focusing lens when the detecting unit is no longer capable of detecting the focusing target, and either the first and second focus detection areas have been set by a number of times that is greater than or equal to a predetermined number of times or when a predetermined amount of time has elapsed.

8. A focus adjusting device comprising:
  a detecting unit configured to detect, from an image picked up by an image pickup optical system, an image of an object to be focused;
  a setting unit configured to set a focus detection area when the image pickup optical system is in a focused state; and
  a focus adjusting unit configured to adjust a focus by driving the image pickup optical system on the basis of a signal output at the focus detection area,
  wherein the setting unit is operable to set at least one second focus detection area after setting a first focus detection area and in accordance with the position of the first focus detection area, corresponding to the object image that is detected by the detecting unit and that is to be focused,
  wherein a focused state that is obtained in the focus detection area when the detecting unit is capable of detecting the object image to be focused is set as a reference value, and the focus adjusting unit is configured to drive the image pickup optical system on the basis of a comparison between the reference value and a focused state obtained at the first focus detection area and a comparison between the reference value and a focused state obtained at the second focus detection area.

9. A focus adjusting device according to claim 8, further comprising a determining unit configured to, when the values of the focused states obtained at the first and second focus detection areas vary with respect to the reference value by a predetermined proportion, determine that the object image has moved, detect the focused states in the first and second focus detection areas while driving the image pickup optical system, and determine a focus detection area where the object exists from the first and second focus detection areas on the basis of the reference value and result of the detection.

* * * * *